US008673425B2

(12) United States Patent
Wang et al.

(10) Patent No.: US 8,673,425 B2
(45) Date of Patent: *Mar. 18, 2014

(54) TOUCH PANEL AND MANUFACTURING METHOD THEREOF

(71) Applicant: Wistron Corporation, New Taipei (TW)

(72) Inventors: Kuei-Ching Wang, Taoyuan County (TW); Ta-hu Lin, Taipei (TW); Tung-Hsin Liu, Taichung (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,235

(22) Filed: Oct. 4, 2012

(65) Prior Publication Data

US 2013/0088281 A1    Apr. 11, 2013

(30) Foreign Application Priority Data

Oct. 5, 2011    (TW) .............................. 100136126 A

(51) Int. Cl.
*B32B 3/10*    (2006.01)

(52) U.S. Cl.
USPC ........... 428/138; 428/201; 428/203; 428/204; 428/207; 428/209; 345/173

(58) Field of Classification Search
USPC ................ 428/138, 201, 203, 204, 207, 209; 345/173; 29/622; 178/18.3, 18.01; 200/512; 349/12
See application file for complete search history.

(56) References Cited

U.S. PATENT DOCUMENTS

| 2010/0045613 A1* | 2/2010 | Wu et al. ........................ 345/173 |
| 2011/0148780 A1* | 6/2011 | Lu et al. ......................... 345/173 |
| 2012/0285810 A1* | 11/2012 | Wang et al. .................... 200/512 |
| 2013/0135233 A1* | 5/2013 | Wang et al. .................... 345/173 |

* cited by examiner

*Primary Examiner* — Maria Veronica Ewald
*Assistant Examiner* — Tong Guo
(74) *Attorney, Agent, or Firm* — Winston Hsu; Scott Margo

(57) ABSTRACT

A touch panel includes a substrate, a transparent conductive layer, a conductive decoration pad, a decoration layer and an opaque conductive layer. The transparent conductive layer is disposed on the substrate, and the conductive decoration pad is disposed on the transparent conductive layer. The decoration layer is disposed on the conductive decoration pad and the transparent conductive layer, and has an opening located on the conductive decoration pad. The opaque conductive layer is disposed on the decoration layer and electrically connected with the transparent conductive layer through the opening and the conductive decoration pad.

15 Claims, 4 Drawing Sheets

TOUCH PANEL AND MANUFACTURING METHOD THEREOF

CROSS REFERENCE TO RELATED APPLICATIONS

This Non-provisional application claims priority under 35 U.S.C. §119(a) on Patent Application No(s). 100136126 filed in Taiwan, Republic of China on Oct. 5, 2011, the entire contents of which are hereby incorporated by reference.

BACKGROUND OF THE INVENTION

1. Field of Invention

The present invention relates to an input panel and a manufacturing method thereof. In particularly, the present invention relates to a touch panel and a manufacturing method thereof.

2. Related Art

Various kinds of touch input devices have been widely applied to different electronic products such as mobile phones and tablet computers. Accordingly, the user can simply move his/her finger on the touch input panel to control the cursor or to input instructions or texts. In addition, the display panel cooperated with the touch panel can show the virtual buttons, so that the user can exactly input the desired texts corresponding to the virtual buttons.

In general, the touch panels include resistive, capacitive, ultrasonic, and infrared types. In practice, the resistive touch panel is the most popular one. The designs of the resistive touch panel mainly include four-wire, five-wire, six-wire, eight-wire resistive touch panels. At the present, the four-wire touch panel, which is cheaper and well developed, is widely applied to the productions and applications.

The touch panel includes a substrate, a circuit layer disposed on the substrate, an insulation layer, and a flexible printed circuit board pattern. However, the substrate is usually made of a transparent material such as glass, and the adhesive material disposed at the periphery of the substrate is also made of a transparent material. Accordingly, the insulation layer and the flexible printed circuit board pattern can not be blocked from the view side, so that the user may see the insulation layer and the flexible printed circuit board pattern from the substrate side. In order to solve this visual inaesthetic issue, it is necessary to add a frame around the housing in which the touch panel is assembled. Although the frame can cover and block the inaesthetic part, such as the insulation layer and the flexible printed circuit board pattern, an additional drawback that the housing must provide some extra spaces for assembling the frame occurs.

Therefore, it is an important subject of the present invention to provide a touch panel and a manufacturing method thereof that can artfully block the circuit located at the periphery of the substrate.

SUMMARY OF THE INVENTION

In view of the foregoing, an objective of the present invention is to provide a touch panel and a manufacturing method thereof that can block the circuit located at the periphery of the substrate.

Another objective of the present invention is to provide a novel touch panel design, so that the substrate of the touch panel can possess multiple functions including decorating and shielding the internal circuits, protecting the inside components, and/or providing complete touch control function.

To achieve the above objective, the present invention discloses a touch panel including a substrate, a transparent conductive layer, a conductive decoration pad, a decoration layer and an opaque conductive layer. The transparent conductive layer is disposed on the substrate, and the conductive decoration pad is disposed on the transparent conductive layer. The decoration layer is disposed on the conductive decoration pad and the transparent conductive layer, and has an opening located on the conductive decoration pad. The opaque conductive layer is disposed on the decoration layer and electrically connected with the transparent conductive layer through the opening and the conductive decoration pad.

To achieve the above objective, the present invention also discloses a manufacturing method of a touch panel, including the following steps of: forming a transparent conductive layer on a substrate; forming a conductive decoration pad on the transparent conductive layer; forming a decoration layer on the conductive decoration pad, wherein the decoration layer has an opening located on the conductive decoration pad; and forming an opaque conductive layer on the decoration layer, wherein the opaque conductive layer is electrically connected with the transparent conductive layer through the opening and the conductive decoration pad.

In one embodiment, the conductive decoration pad entirely covers the opening. Besides, the conductivity of the conductive decoration pad is superior to that of the decoration layer, and the color of the conductive decoration pad is similar to that of the decoration layer.

In one embodiment, a part of the opaque conductive layer is connected in the opening. Otherwise, in another embodiment, the touch panel further includes a conductive filler disposed in the opening. In another embodiment, conductive filler and a part of the opaque conductive layer are connected in the opening.

In one embodiment, the transparent conductive layer is defined with a touch sensing circuit.

In one embodiment, the touch panel further includes a conductive pad and a conductive adhesive for bonding the conductive pad with the opaque conductive layer.

In one embodiment, the touch panel is a resistive touch panel or a capacitive touch panel.

In one embodiment, the substrate has both of a touch sensing function and a protection function for replacing a cover or a cover lens.

In one embodiment, the substrate is a transparent plastic substrate, a transparent glass substrate, a PI (polyimide) substrate, or a PET (polyethylene terephthalate) substrate.

As mentioned above, the present invention configures an opening for directly or indirectly electrically connecting the opaque conductive layer and the transparent conductive layer. Moreover, the opening of the decoration layer is disposed above the conductive decoration pad of the transparent conductive layer, so that the conductive decoration pad and the decoration layer can cover and block the periphery circuit. This configuration can effectively avoid the exposedness of the periphery circuit, so the user can not view the periphery circuit. Besides, only a single substrate is used in the touch panel and its manufacturing method of this invention, so that the additional transparent adhesive or cover lens is unnecessary, which can make the products become thinner.

More important, the substrate of the touch panel of the present invention possesses multiple functions, which is not available in the conventional art. The multiple functions include: a decoration function for decorating and shielding the internal circuits, a protection function for protecting the conductive layer and the inside circuits, and a complete touch control function provided by configuring the complete conductive layer. In brief, the conventional art needs additional manufacturing processes and materials to form a cover for providing the desired decoration and protection functions; on the contrary, the novel design of this invention can easily carry out the concept of multi-function substrate. Since the substrate of this invention has improved functions, it is possible to omit another substrate in the panel. Thus, the additional attaching or assembling steps for providing the desired decoration purpose can be reduced, so the invention is suitable for modulation processes and can decrease the manufacturing cost.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
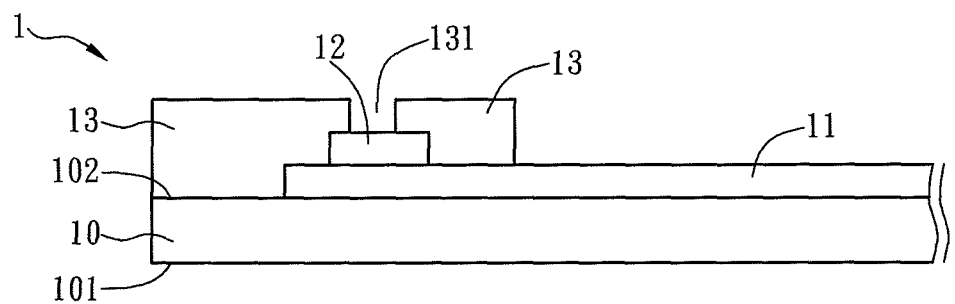
FIGS. 1A to 1C are schematic diagrams of a touch panel according to a preferred embodiment of the present invention.
Figure 1B:
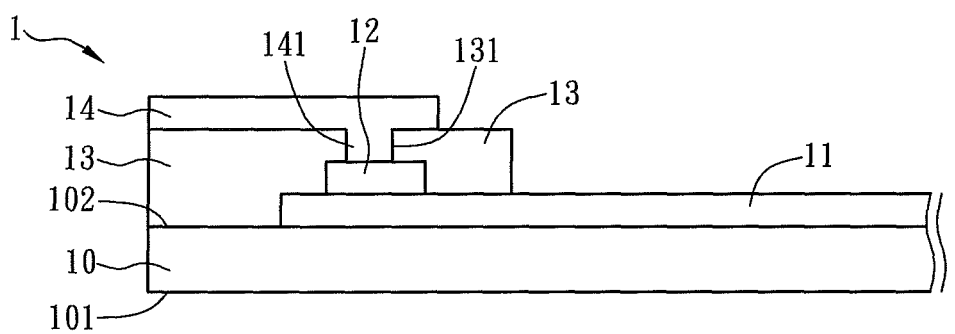
Figure 1C:
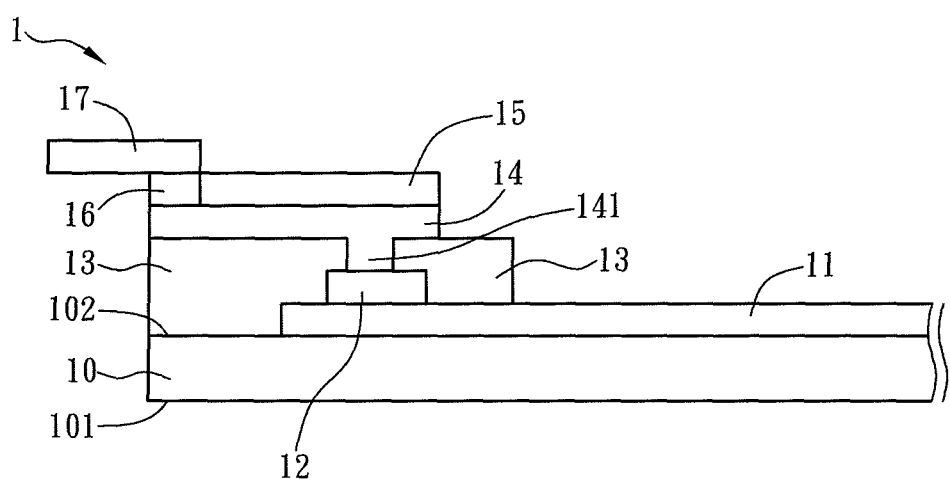

FIGS. 1A to 1C are schematic diagrams of a touch panel 1 according to a preferred embodiment of the present invention. As shown in FIG. 1A, the touch panel 1 includes a substrate 10, a transparent conductive layer 11, a conductive decoration pad 12, and a decoration layer 13. The transparent conductive layer 11 is disposed on the substrate 10, and the conductive decoration pad 12 is disposed on the transparent conductive layer 11. The decoration layer 13 is disposed on the conductive decoration pad 12 and the transparent conductive layer 11, and has an opening 131 located on the conductive decoration pad 12.

For example, the transparent conductive layer 11, the conductive decoration pad 12, and the decoration layer 13 can be formed on the substrate 10 in sequence by the following steps of: forming a transparent conductive layer 11 on a substrate 10; forming a conductive decoration pad 12 on the transparent conductive layer 11; and forming a decoration layer 13 on the conductive decoration pad 12. Herein, the decoration layer 13 has an opening 131 located on the conductive decoration pad 12.

The transparent conductive layer 11 is patterned to define the touch sensing circuit. The material of the transparent conductive layer 11 is indium tin oxide (ITO) or any other suitable conductive material, and the material of the decoration layer 13 is an insulation material for example. The transparent conductive layer 11 has a plurality of strips, which define the touch sensing circuit within the touch input area of the touch panel 1. The portion of the transparent conductive layer 11 located within the touch input area is not covered by the decoration layer 13.

The outer surface 101 of the substrate 10 is provided for the operation of the user. In general, the user can view the touch panel 1 through the outer surface 101 and operate it on the outer surface 101. The residual layers and components of the touch panel 1 are disposed on the inner surface 102 of the substrate 10.

Referring to FIG. 1B, the touch panel 1 further includes an opaque conductive layer 14, which is disposed on the decoration layer 13 and electrically connected with the transparent conductive layer 11 through the opening 131 and the conductive decoration pad 12. The material of the opaque conductive layer 14 includes silver paste, which can be printed on the decoration layer 13 by screen printing. In practice, the screen with fine pattern is used to define the desired fine circuit of the opaque conductive layer 14. A part 141 of the opaque conductive layer 14 is filled in the opening 131 and electrically connected with the transparent conductive layer 11.

After the layers of FIG. 1A are formed, for example, the opaque conductive layer 14 is then formed on the decoration layer 13. The conductivity of the conductive decoration pad 12 is superior to that of the decoration layer 13, so that the opaque conductive layer 14 and the transparent conductive layer 11 can be coupled with each other through the conductive decoration pad 12 rather than the decoration layer 13.

In practice, the conductive decoration pad 12 can be in any shape and in any color. Preferably, the color of the conductive decoration pad 12 is similar to that of the decoration layer 13. Accordingly, the user may not easily observe the difference between the conductive decoration pad 12 and the decoration layer 13 while viewing the outer surface 101 of the touch panel 1. The part 141 of the opaque conductive layer 14 is disposed in the opening 131. Preferably, the opening 131 is fully filled with the material of the opaque conductive layer 14 for occupying the entire space inside the opening 131. Otherwise, even if the opening 131 is not fully filled with the material of the opaque conductive layer 14 for occupying the entire space inside the opening 131, the color difference may still not easily observed by the user. This is because, when viewing from the outer surface 101 side, the conductive decoration pad 12 can cover and block the opening 131, so that the user can not observe the color difference caused by the incompletely filled opening 131 while viewing the touch panel 1 through the outer surface 101. This feature can further fix the alignment error caused in the manufacturing processes.

The material of the conductive decoration pad 12 may include, for example but not limited to, carbon, nano-copper, nano-silver, or conductive polymer, and the material of the decoration layer 13 includes, for example but not limited to, an insulation ink of various colors.

In addition, the opaque conductive layer 14 does not extend over the decoration layer 13, and the material thereof may be metal.

As shown in FIG. 1C, the touch panel 1 further includes an insulation layer 15, a conductive adhesive 16, and a conductive pad 17 (or connected pad). The insulation layer 15 is disposed on the opaque conductive layer 14, and the conductive adhesive 16 bonds the conductive pad 17 with the opaque conductive layer 14.

For example, the insulation layer 15 is formed by screen printing to cover the opaque conductive layer 14. The insulation layer 15 is configured to protect the opaque conductive layer 14 and prevent it to contact with the air, which may cause the undesired oxidation. The conductive pad 17 may be a part of a flexible printed circuit board, and it is bonded on the opaque conductive layer 14 and adjacent to the insulation layer 15 by the conductive adhesive 16. Accordingly, the conductive pad 17 can be electrically connected with the transparent conductive layer 11 through the conductive adhesive 16 and the opaque conductive layer 14. In this embodiment, the conductive adhesive 16 can be an anisotropic conductive film (ACF) or an anisotropic conductive paste (ACP).

Figure 2A:
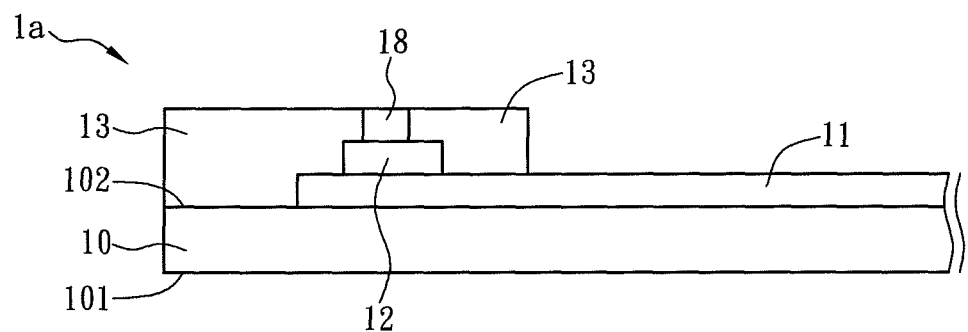
FIGS. 2A and 2B are schematic diagrams of a touch panel according to another preferred embodiment of the present invention.
Figure 2B:
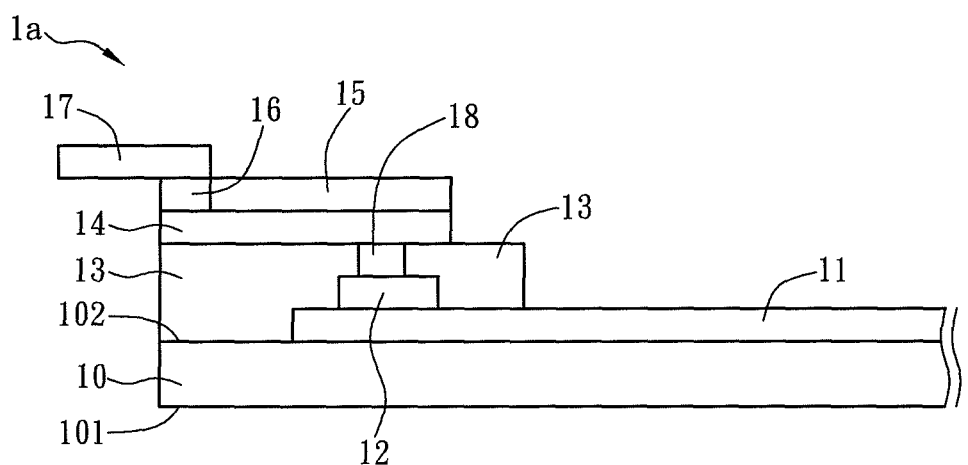

FIGS. 2A and 2B are schematic diagrams of a touch panel 1a according to another preferred embodiment of the present invention. As shown in FIG. 2A, the transparent conductive layer 11 is disposed on the substrate 10, and the conductive decoration pad 12 is disposed on the transparent conductive layer 11. The decoration layer 13 is disposed on the conductive decoration pad 12 and the transparent conductive layer 11, and has an opening 131 located on the conductive decoration pad 12. A conductive filler 18 is disposed in the opening 131. The structures and fabrication processes of the transparent conductive layer 11, the conductive decoration pad 12 and the decoration layer 13 are similar to those described in FIG. 1A.

Referring to FIG. 2B, the opaque conductive layer 14 is disposed on the decoration layer 13 and the conductive filler 18. In other words, the conductive filler 18 is filled into the opening 131 before forming the opaque conductive layer 14 on the decoration layer 13 and the conductive filler 18. Similar to FIG. 1C, the insulation layer 15 is then disposed on the opaque conductive layer 14, and the conductive adhesive 16 is provided to bond the conductive pad 17 with the opaque conductive layer 14.

Figure 3A:
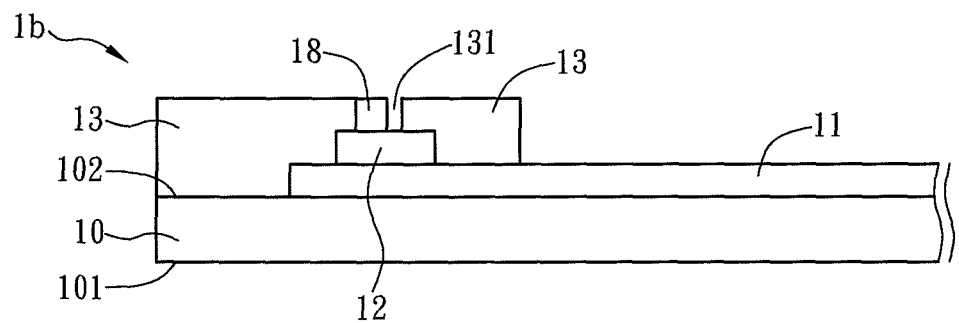
FIGS. 3A and 3B are schematic diagrams of a touch panel according to another preferred embodiment of the present invention.
Figure 3B:
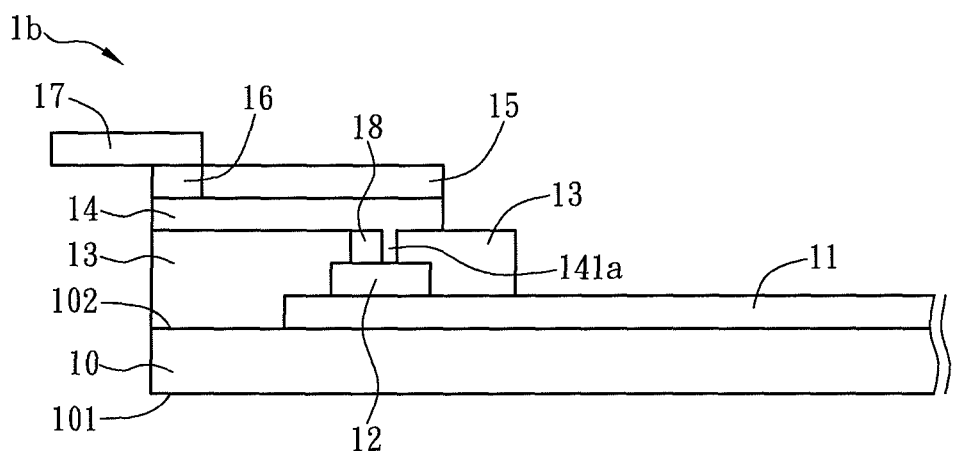

FIGS. 3A and 3B are schematic diagrams of a touch panel 1b according to another preferred embodiment of the present invention. As shown in FIG. 3A, the transparent conductive layer 11 is disposed on the substrate 10, and the conductive decoration pad 12 is disposed on the transparent conductive layer 11. The decoration layer 13 is disposed on the conductive decoration pad 12 and the transparent conductive layer 11, and has an opening 131 located on the conductive decoration pad 12. A conductive filler 18 is disposed in the opening 131, while the opening 131 is not fully filled with the conductive filler 18. The structures and fabrication processes of these layers are similar to those described in FIG. 1A.

Referring to FIG. 3B, the opaque conductive layer 14 is disposed on the decoration layer 13 and the conductive filler 18, while the residual space in the opening 131, which is not fully filled by the conductive filler 18, is now filled by a part 141a of the opaque conductive layer 14. In other words, the conductive filler 18 is filled into the opening 131 before forming the opaque conductive layer 14 on the decoration layer 13 and the conductive filler 18 as well as in the residual space in the opening 131. Similar to FIG. 1C, the insulation layer 15 is then disposed on the opaque conductive layer 14, and the conductive adhesive 16 is provided to bond the conductive pad 17 with the opaque conductive layer 14.

Since the conductive decoration pad 12 is provided on the transparent conductive layer 11, which is disposed on the substrate 10, the opening 131, the opaque conductive layer 14, or the conductive filler 18 of the touch panels 1-1b can not be saw through the outer surface 101. This feature can also fix the alignment error caused in the manufacturing processes.

In all of the above embodiments, the touch panel can be a resistive touch panel or a capacitive touch panel (e.g. a projective capacitive touch panel).

In all of the above embodiments, the touch panel 1-1b can be flexible or nonflexible touch panel. The substrate 10, 10a can be a transparent substrate, such as a transparent plastic substrate, a transparent glass substrate, a PI (polyimide) substrate, or a PET (polyethylene terephthalate) substrate.

In addition, each of the touch panels 1-1b may include a single substrate. Regarding to these touch panel 1-1b, an additional substrate is not necessary, so that the entire thickness thereof can be thinner, thereby improving the entire transmission. In addition, since only one substrate is configured, the process for laminating two substrates in the prior art is not needed. This feature can not only avoid the lower yield issue caused by the laminating process, but also omit the laminating process as well as the necessary materials (e.g. transparent adhesive or cover lens) in this process. Accordingly, the production yield can be increased, and the manufacturing cost can be decreased.

Preferably, the substrate 10, 10a of the touch panel 1-1b has multiple functions. First, after assembling, the substrate 10, 10a is located at the outer surface for covering the internal circuits, the transparent conductive layer 11, 11a and other components. Second, the substrate 10, 10a is configured with the conductive decoration pad and decoration layer for providing the desired decoration function and covering the internal circuit. Third, the substrate 10, 10a can protect the internal circuits and the transparent conductive layer 11, 11a. In addition, the entire transparent conductive layer 11, 11a can be disposed on the substrate 10, 10a for providing the complete sensing function. Accordingly, the present invention makes the manufacturing processes of the substrate simpler, and the substrate has multiple functions. This novel concept can avoid the additional process for attaching another layer, which is suitable for modulation process and can decrease the manufacturing cost. Under the above concept, the present invention is not limited and includes all aspects of touch panels that are substantially manufactured by the same or similar manufacturing process or have substantially the same or similar structure.

Alternatively, in the above embodiments, each of the touch panels 1-1b may include at least two substrates. For example, the substrate 10 may be bonded with another substrate.

Figure 4:
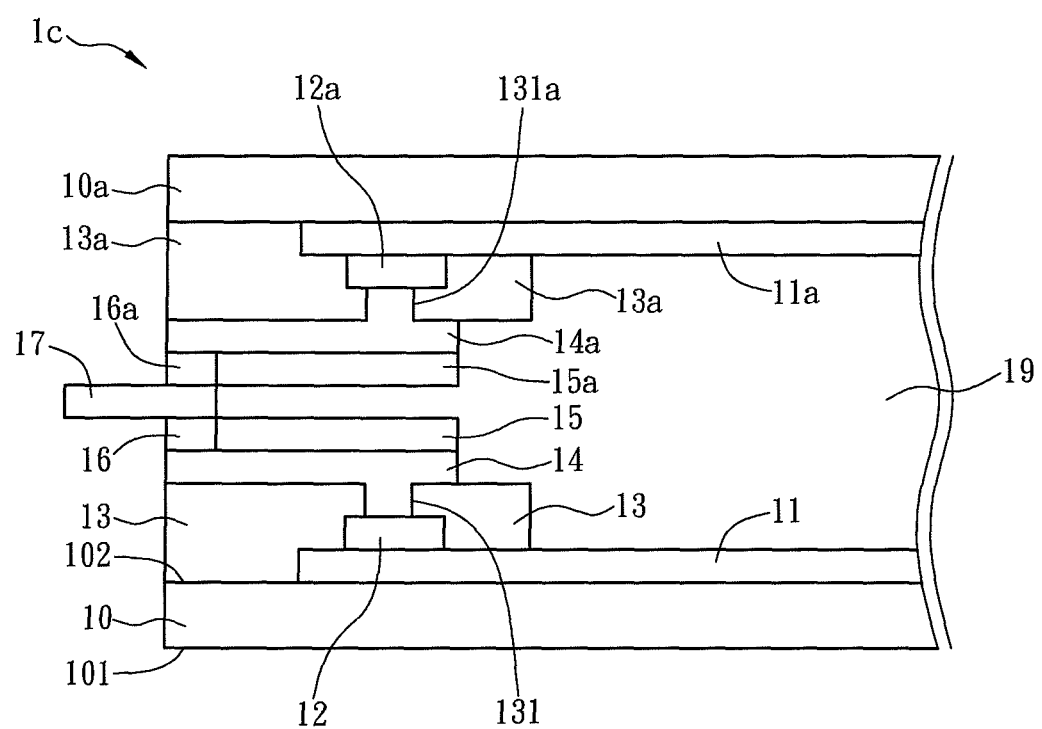
FIG. 4 is a schematic diagram of a touch panel according to another preferred embodiment of the present invention.

FIG. 4 is a schematic diagram of a touch panel 1c according to another preferred embodiment of the present invention. As shown in FIG. 4, the touch panel 1c includes two substrates 10 and 10a, two transparent conductive layers 11 and 11a, two conductive decoration pads 12 and 12a, two decoration layers 13 and 13a, two opaque conductive layers 14 and 14a, two insulation layers 15 and 15a, two conductive adhesives 16 and 16a, a conductive pad 17, and a transparent insulation layer 19. The transparent insulation layer 19, such as an optical adhesive, is disposed between the transparent conductive layers 11 and 11a. Since the structures and fabrication processes of the substrate 10a, the transparent conductive layer 11a, the conductive decoration pad 12a, the decoration layer 13a, the opaque conductive layer 14a, the insulation layer 15a, and the conductive adhesive 16a are similar to those corresponding elements shown in FIGS. 1A to 1C, the detailed descriptions thereof are omitted.

Of course, the substrate 10 also has both of the decoration and protection functions, so that is a multi-function substrate. Thus, it can avoid the additional attaching step and match the concept of the invention. According to the above embodiments, it is proved that the concept of multi-function substrate of the invention can be suitable for both single-layer and multi-layer substrates.

In addition, the opening 131a of the decoration layer 13a may be filled with the conductive filler as shown in FIG. 2A; otherwise, the opening 131a of the decoration layer 13a may be filled with the conductive filler and a part of the opaque conductive layer 14a as shown in FIG. 3A.

Alternatively, the touch panel 1c can be a capacitive touch panel, in which air instead of the transparent insulation layer 19 is configured between two substrates 10 and 10a. In other words, an air layer is disposed between the transparent conductive layers 11 and 11a of the capacitive touch panel 1c, and the air layer is directly contact with the transparent conductive layers 11 and 11a. This configuration can reduce the cost for the opaque conductive layer 14a. Besides, since the process for adhering two sides of the opaque conductive layer 14a is not needed, the overall manufacturing processes is simplified, thereby preventing the low production yield caused by the adhering defects. Moreover, the capacity of the capacitor and the dielectric constant between two electrodes are in positive correlation, and the response time of the touch panel and the capacity of the capacitor are also in positive correlation. Since the dielectric constant of air is smaller than that of the optical adhesive, the capacity of the capacitor configured by the transparent conductive layers 11 and 11a can be decreased after replacing the transparent insulation layer 19 by air. This configuration can also reduce the response time of the touch panel 1c, so that the response speed of the touch panel 1c can be increased.

In summary, the present invention configures an opening for directly or indirectly electrically connecting the opaque conductive layer and the transparent conductive layer. Moreover, the opening of the decoration layer is disposed above the conductive decoration pad of the transparent conductive layer, so that the conductive decoration pad and the decoration layer can cover and block the periphery circuit. This configuration can effectively avoid the exposedness of the periphery circuit, so the user can not view the periphery circuit. Besides, only a single substrate is used in the touch panel and its manufacturing method of this invention, so that the additional transparent adhesive or cover lens is unnecessary, which can make the products become thinner.

Most important, the substrate of the touch panel of the present invention possesses multiple functions, which is not available in the conventional art. The multiple functions include: a decoration function for decorating and shielding the internal circuits, a protection function for protecting the conductive layer and the inside circuits, and a complete touch control function provided by configuring the complete conductive layer. In brief, the conventional art needs additional manufacturing processes and materials to form a cover for providing the desired decoration and protection functions; on the contrary, the novel design of this invention can easily carry out the concept of multi-function substrate. Since the substrate of this invention has improved functions, it is possible to omit another substrate in the panel. Thus, the additional attaching or assembling steps for providing the desired decoration purpose can be reduced, so the invention is suitable for modulation processes and can decrease the manufacturing cost.

For example, the touch panel has only one substrate which is functioned as a cover lens and a touch sensor. The opposite sides of the substrate are an inner side and an outer side, wherein the transparent conductive layer, conductive decoration pad, decoration layer and non-transparent conductive layer are disposed on the inner side, and the outer side is configured without any of such layers. Herein, the outer side is used as the touch input surface. The touch panel is assembled with the casing, and the components on the inner surface are located inside the casing while the outer surface faces toward the outside. In addition, the touch panel can also be assembled with other electronic device. For example, the touch panel can be assembled with a display panel, and the inner side of the touch panel faces toward the display panel. No matter the touch panel is assembled with which device, the single substrate can function as a cover lens for protecting the inside layers.

In addition, when two substrates are configured, the touch panel of the invention still has the advantage of omitting the additional attaching or assembling step.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch panel, comprising:
    a substrate;
    a transparent conductive layer disposed on the substrate;
    a conductive decoration pad disposed on the transparent conductive layer;
    a decoration layer disposed on the conductive decoration pad and the transparent conductive layer, and having an opening located on the conductive decoration pad; and
    an opaque conductive layer disposed on the decoration layer and electrically connected with the transparent conductive layer through the opening and the conductive decoration pad.

2. The touch panel of claim 1, wherein the conductive decoration pad entirely covers the opening.

3. The touch panel of claim 1, wherein the conductivity of the conductive decoration pad is superior to that of the decoration layer.

4. The touch panel of claim 1, wherein the color of the conductive decoration pad is similar to that of the decoration layer.

5. The touch panel of claim 1, wherein the conductive decoration pad is in any shape and in any color.

6. The touch panel of claim 1, wherein the material of the conductive decoration pad comprises carbon, nano-copper, nano-silver, or conductive polymer, and the material of the decoration layer comprises an insulation ink of various colors.

7. The touch panel of claim 1, wherein a part of the opaque conductive layer is located in the opening.

8. The touch panel of claim 1, further comprising:
    a conductive filler disposed in the opening.

9. The touch panel of claim 1, wherein the transparent conductive layer is defined with a touch sensing circuit.

10. The touch panel of claim 1, further comprising:
    a conductive pad; and
    a conductive adhesive for bonding the conductive pad with the opaque conductive layer.

11. The touch panel of claim 1, which is a resistive touch panel or a capacitive touch panel.

12. The touch panel of claim 1, wherein the substrate has both a touch sensing function and a protection function.

13. The touch panel of claim 1, wherein the substrate is a transparent plastic substrate or a transparent glass substrate.

14. A manufacturing method of a touch panel, comprising steps of:
    forming a transparent conductive layer on a substrate;
    forming a conductive decoration pad on the transparent conductive layer;
    forming a decoration layer on the conductive decoration pad, wherein the decoration layer has an opening located on the conductive decoration pad; and
    forming an opaque conductive layer on the decoration layer, wherein the opaque conductive layer is electrically connected with the transparent conductive layer through the opening and the conductive decoration pad.

15. The manufacturing method of claim 14, wherein the substrate is a transparent plastic substrate or a transparent glass substrate.

\* \* \* \* \*